Feb. 17, 1970   E. K. VON BRAND   3,495,439
ANALYTICAL APPARATUS AND METHOD FOR INSTANTANEOUSLY
RECORDING AND READING CONTAMINANTS
IN FLUENT MATERIALS
Filed April 6, 1966
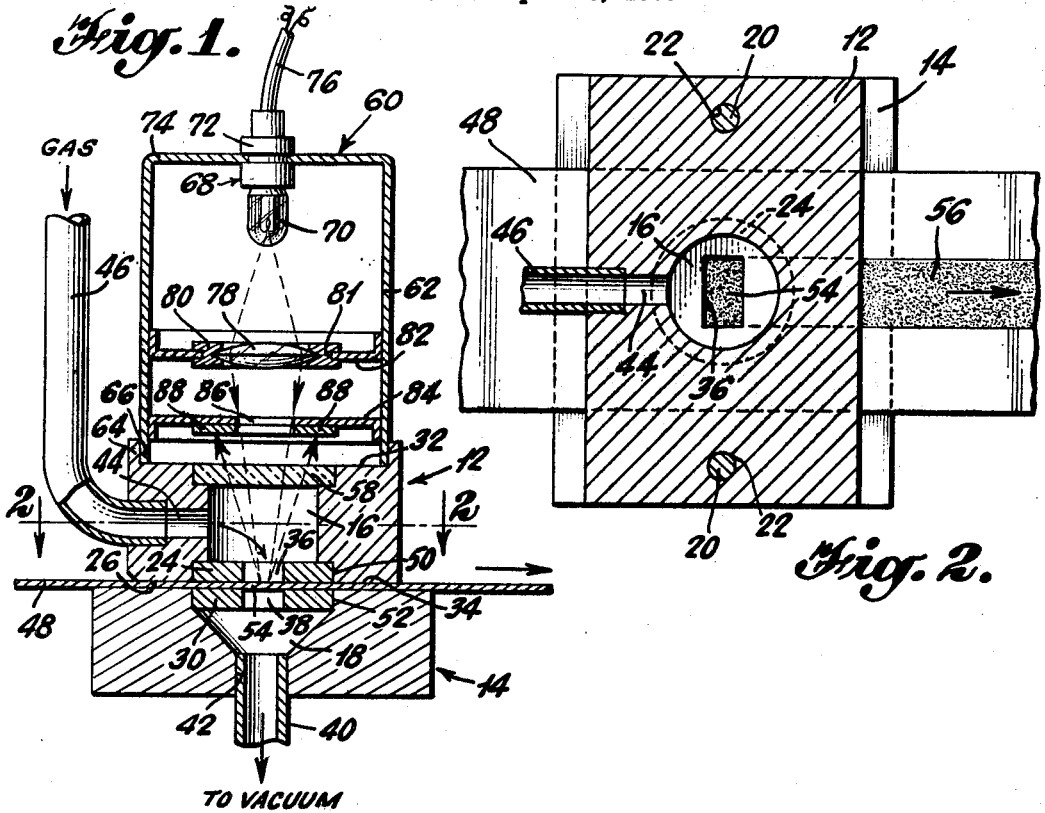
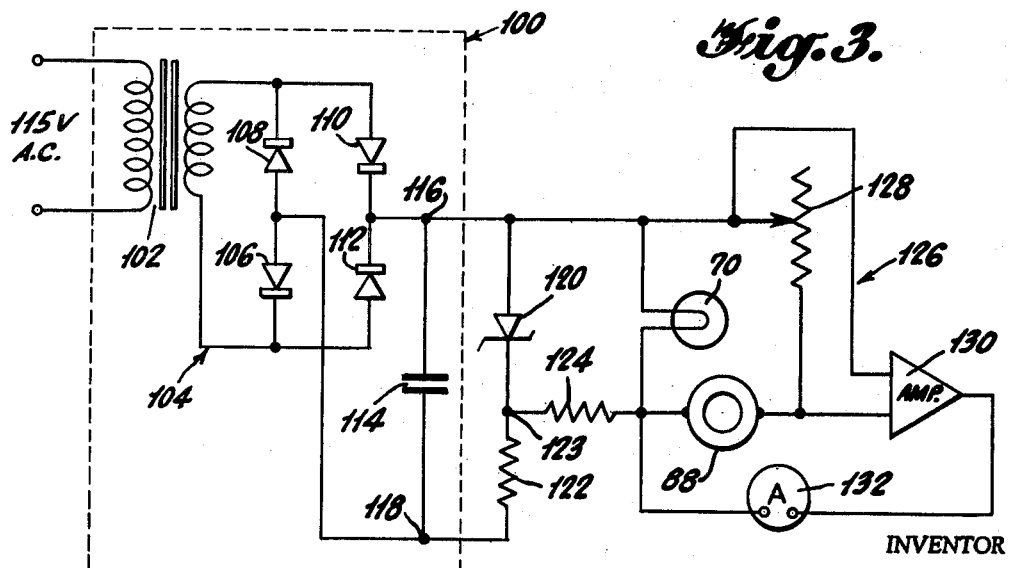
INVENTOR
*Ernest Kurt von Brand*
BY *Stevens, Davis, Miller & Mosher*
ATTORNEYS

United States Patent Office 3,495,439
Patented Feb. 17, 1970

3,495,439
ANALYTICAL APPARATUS AND METHOD FOR INSTANTANEOUSLY RECORDING AND READING CONTAMINANTS IN FLUENT MATERIALS
Ernest K. von Brand, Kent, N.Y.
(Hopewell Junction, N.Y. 12533)
Filed Apr. 6, 1966, Ser. No. 540,704
Int. Cl. G01n 21/28
U.S. Cl. 73—28
10 Claims

ABSTRACT OF THE DISCLOSURE

The disclosed apparatus and method obtains an instantaneous and continuous reading and permanent record of contaminants in a fluid, such as solids in air. The apparatus utilizes a filter tape which moves continuously across a predetermined flow path of the fluid to be analyzed and causes the contaminants to be deposited on the filter tape as a permanent record. Mounted in longitudinal alignment with the intersection of the path of the filter tape and the flow path of the fluid is a light source directed at the intersection and a photocell which instantaneously and continuously senses the light reflected from the filter tape at the intersection. The quantity of light sensed is proportional to the quantum of contaminant deposited on the filter tape at the intersection.

---

This invention relates to an apparatus and method for studying the content of fluids such as liquid and air pollution analyses, gas contamination studies and the like. It is especially concerned with providing a device and method for obtaining an accurate recordation and instantaneous reading of the quantity of a contaminant present in fluids and, more specifically, solid particles such as soot and unburned fuel present in gases being discharged from combustion chambers. As such, this invention involves an improvement over my earlier invention disclosed and claimed in U.S. Patent No. 2,667,779 relating to a continuous contaminant recorder.

My earlier invention provides a device for fluid study and recording the content of a particular constituent in a speedy and accurate manner on a continuous unbroken record from the beginning of the test to its conclusion. Further, the invention permitted the study of fluid under various conditions including high moisture content and high and low constituent content, and the apparatus permitted control of the rate of fluid flow, the rate of exposure, and the area of the sensing medium exposed as required by conditions of the fluid being tested. However, this earlier invention was incapable of providing an instantaneous content reading for the contaminant under study in the fluid tested; it requires inspection or analysis of the tape record after it has left the recording apparatus at some interval of time subsequent to the point in time when the content was recorded by actual deposit of the contaminant on the tape.

While there are testing devices in use in the industry today which provide a substantially instantaneous and continuous analysis of a contaminant in a fluid under test, such continuous type devices operate on the principle of determining the degree of transparency of the fluid. A recording device is used in conjunction with photoelectric equipment so that a permanent record of the study is obtained. However, this type of equipment is subject to a major drawback due to its poor sensitivity below the feasibility level of the photoelectric equipment which is directed to measuring fluid transparency. This disadvantage prevents the use of the equipment except in study of fluids containing an established minimum of contamination.

It is the purpose of this invention to overcome the foregoing described drawbacks in prior devices.

It is the primary object of this invention to provide a measuring or reading device and method which will not only permanently record the content of a particular constituent of a fluid in a speedy and accurate manner, but also will instantaneously read the degree or quantum of such contamination as recorded. This recordation is provided in a continuous and unbroken manner from the inception to the conclusion of the test, and by means of instantaneously sensitive equipment the record is interpreted to provide an immediate reading for analysis and a signal for use in controlling the environmental conditions which establish in the first instance the quantum of the constituent being tested. The invention thereby provides instantaneously responsive control means for regulating environmental conditions for the equipment which produces the fluid being tested at the time the actual record of the test is being made. The apparatus of this invention is simple in construction, easy to operate, economical to produce, involves a minimum of parts, is very light in weight, and readily portable for use wherever desired.

Generally speaking, the apparatus of this invention operates to continuously draw off and filter a contaminated fluid through succeeding portions of a continuously moving filter tape so as to record the contaminant content immediately on the tape by depositing a quantum of the contaminant thereon. By means of established constant rates for fluid flow and filter tape movement, changes in the degree of contamination are recorded by changes in the amount of deposit on the filter tape. With the contaminant content being so recorded on the filter tape, a reading device is provided to instantly interpret the quantum of contaminant recorded on the tape as it is deposited thereon. Thereby, changes in the degree of contamination in the fluid under test are instantaneously read and interpreted. These readings or interpretations can then be transmitted as signals to control the operation of the equipment causing the contaminant content of the fluid under test. The apparatus is adapted to vary the quantity, velocity and temperature condition of the incoming fluid and is also adapted to filter a given volume of fluid through either a lesser or greater portion of the tape by altering the area of tape that is exposed to the fluid, or by changing the speed by which the tape is moved through the fluid stream. Such alterations in the operational characteristics of the apparatus of the present invention can be made without any delay and the effect of such alteration made immediately apparent on the tape record and in the signal emanating from the device which reads the record.

The specific embodiment of the invention illustrated in the accompany drawings utilizes to a certain degree apparatus similar to that disclosed in my prior Patent No. 2,667,779, for recording the content of contamination. A pair of vertically aligned heads, each having a chamber through its vertical dimension, are positioned to vertically communicate the chambers one with the other. The chambers communicate through apertures in a pair of plates or inserts, the lower insert recessed in the top of the lower head (outflow head) and the upper insert recessed in the bottom of the upper head (inflow head) whereby when the inserts are assembled the apertures therein are in registry. The chamber in the inflow head is connected by suitable flexible means to a source of the gas (in this embodiment) to be studied and the chamber in the outflow head is connected to a vacuum or suction device. A reel of filter tape is mounted relative to the upper and lower heads and is drawn horizontally by suitable means between the inflow head and the outflow head. In passing between the inserts, the tape travels in a path which laterally intersects the longitudinal axis of the aperture openings, thus causing the gas as it is drawn by vacuum from the inflow chamber through the apertures into the outflow chamber to be filtered by the tape. The inserts provided above and below the tape at the mouth of each chamber may be substituted in order to alter the area of the tape that is exposed to the gas path as desired. The tape is considerably wider than the width dimension of the inserts so that the tape itself acts as a gasket and seals the vacuum side of the unit. The insert recessed in the inflow head fits sufficiently tightly on the tape and the insert recessed in the outflow head so as to substantially eliminate leakage into the gas stream from the atmosphere.

The flexible means, by which the inflow chamber is connected to the source for the gas to be studied, communicates with the inflow chamber from the side of the inflow head in order to leave the vertical view of the arranged chambers substantially unobstructed.

The top of the inflow chamber is tightly sealed by a window above which is mounted on the upper head a combination light source and light sensitive cell instantaneously and continuously reading the quantity of material which has been filtered onto the moving tape at the point of the aperture. The light source is mounted directly above the aligned apertures of inserts recessed in the inflow and outflow heads. The light rays from the light source are condensed and shuttered by a lens and and apertured horizontal wall mounted between the light source and the window in the top of the inflow head. Photocells or solar cells are mounted below the aforesaid horizontal wall and are so positioned as to receive the light rays reflected from the portion of the tape appearing in the aperture of the upper insert as seen from the inflow chamber. The degree of reflection of light rays as read by the light sensitive cells produces an appropriate electrical signal which after amplification can be read on a conventional ammeter for instantaneous study of the contaminant concentration. The signal from the cells can also be used to directly control the operation of the burner or furnace which in fact is creating the gas being tested.

Referring now to the accompanying drawings, which form a part hereof, like numerals refer to like parts throughout:

FIG. 1 is a vertical cross-sectional view showing the preferred arrangement of components for instantaneously recording and reading in accordance with this convention;

FIG. 2 is a cross-sectional horizontal view taken along the line 2—2 of FIG. 1; and FIG. 3 is a schematic electrical circuit diagram illustrating the preferred arrangement of electrical components of the present invention.

In FIG. 1, numeral 12 generally designates the upper recording head or inflow head and numeral 14 generally designates the lower recording head or outflow head which are vertically mounted with respect to each other. The upper head 12 includes a centrally located vertical inflow chamber 16, and the lower head includes a centrally located vertical outflow chamber 18. The upper head 12 has a smooth flat horizontal bottom surface 26, and the lower head 14 has a similar upper surface 34. The inflow chamber 16 and the outflow chamber 18 are vertically aligned and the upper head 12 and lower head 14 are mounted with respect to each other by means of vertically upstanding pins 20 (see FIG. 2) mounted on the lower head 14 and received in corresponding holes 22 in upper head 12. The lower end of the inflow chamber 16 is closed by upper insert 24 which is recessed into the bottom of the inflow head 12 in recess 50. The depth of the recess 50 is equal to the thickness of insert 24 so that when insert 24 is positioned in recess 50 a smooth flat surface defined by the plane of surface 26 is obtained.

Similarly recessed into the top of the outflow head 14 in recess 52 is lower insert 30 which closes the upper end of the outflow chamber 18 and forms with surface 34 a smooth flat surface defined by the plane of surface 34. With respect to the embodiment disclosed herein, the inserts 24 and 30 are vertically aligned, and each has an aperture, upper insert 24 having an aperture 36 and lower insert 30 having an aperture 38. The apertures 36 and 38 are in registry with respect to each other.

The outflow chamber 18 is connected to a suitable vacuum creating device (not shown) by means of a conduit 40 communicating with the chamber 18 and inserted in an opening 42 in the lower portion of the outflow head 14. The inflow head 12 has a horizontal opening 44 which communicates with the inflow chamber 16. In sealed communication with the external end of the opening 44 is a suitable conduit 46 which is connected to the source for a gas or fluent material to be tested and acts in association with the opening 44 to introduce the gas or other material into the inflow chamber 16.

A filter tape denoted by the numeral 48 is positioned between the upper (inflow) head 12 and the lower (outflow) head 14 and correspondingly between the upper insert 24 and the lower insert 30 as shown in FIG. 1. The filter tape 48 is advanced by any conventional means such as a pair of draw off rollers driven by a synchronous motor (not illustrated).

The vacuum forming means communicating with the outflow chamber 18 operates to draw the gas being tested into the inflow chamber 16 through the conduit 46 and opening 44, and thence through the filter tape 48, into the outflow chamber 18, and out through conduit 40. This movement of the gas deposits a quantum of the contaminant under consideration on that portion of the filter tape appearing at any moment in the aperture 36 of the upper insert 24, as at 54. By thus depositing a quantum of contaminant on the filter tape a record is made of the degree of contamination in the gas being tested. This record in the form of a continuous deposit on the filter tape is identified in FIG. 2 by the numeral 56.

Fresh filter tape can be drawn from and collected upon any suitable means such as a storage reel and a collection reel, neither of which reels are illustrated in the drawings. The collection reel is driven to take up the tape as it is advanced by the draw off rollers, and for short tests a collection reel is not necessary.

The upper end of the inflow chamber 16 is closed by a transparent window 58 which is recessed in the top of the inflow head 12 so as to be flush with its substantially horizontal upper surface 32. The window 58 is sealed with respect to the inflow head 12 so as to prevent any leakage from the atmosphere into the gas stream being tested.

Mounted vertically above the inflow head 12 is an instantaneous reading apparatus generally designated by the numeral 60. The reading apparatus 60 includes an outer casing or housing 62 which is suitably mounted atop the inflow head 12. In the illustrated embodiment, this mounting is accomplished by means of a peripheral lip 64 extending upwardly from the upper surface 32 of the head 12 in which is frictionally engaged the lower end 66 of the wall 62. By this arrangement, the reading apparatus 60 is generally vertically aligned with the recording heads 12 and 14 and the inflow chamber 16 and the outflow chamber 18 thereof.

Mounted near the top of the housing 62 is a light fixture 68 including a light bulb 70 projecting downwardly toward the transparent window 58 and longitudinally aligned with the inflow chamber 16 and the aperture 36 of the upper insert 24. The light fixture 68 also includes a mounting 72 which is rigidly secured to the top wall 74 of the housing 62 and electrical conduit 76 connected to a suitable power source to be subsequently described.

Mounted internally of the housing 62 and below the light bulb 70 is a first horizontal support or wall 82 extending the full width of the housing 62 and having a central opening 81. A convex lens 78, the circumference of which is embedded in a suitable material 80, is rigidly supported in a horizontal position within the opening 81 by the support 82 through engagement of the material 80 with the support around the periphery of the opening 81. The lens 78 acts to converge the light rays produced by the light source 68 as illustrated by the arrows in FIG. 1. Also mounted internally of the housing 62 is a second horizontal support or wall 84 which extends the full width of the housing 62. Centrally located in the wall 84 is an opening 86 through which the light rays passing through the lens 78 are shuttered as also indicated by the arrows in FIG. 1. As such, only light rays which are directed toward the aperture 36 will pass through the transparent window 58 into the inflow chamber 16 and onto that portion 54 of the filter tape 48 which appears in the aperture 36. Supported on the underneath side of the wall 84 around the aperture 86 are one or more rectangular solar cells 88 which are so positioned as to receive light rays reflected from portion 54 of the filter tape 48 back through the inflow chamber 16 and the transparent window 58. In place of the rectangular cells, an annular photocell or the like can be positioned on the underneath side of the wall 84 to circumscribe the aperture 86.

As shown in FIG. 2, the tape 48 is substantially wider than the width dimension for the inserts 24 and 30 and, hence, by operation of the vacuum device acts as a gasket to seal the outflow chamber 18 and avoid error by leakage of the atmosphere into the gas stream.

Referring now to the preferred circuitry illustrated in FIG. 3, it is essential to obtain a substantially constant light emission from the lamp 70 since the signal being amplified depends on the quantity of light energy received by the light sensitive cells. Any variation in the energy produced by the lamp 70 results in erroneous comparative signals. The circuit also permits convenient reading of the signal from the cells on an ammeter chart recorder or the like and control of the equipment which is producing the gas or fluid under test.

The power supply package, generally designated by the numeral 100 includes an iron-core transformer 102, the primary coil of which can be connected to any convenient 115-volt A.C. power supply. The secondary coil is connected to a conventional full wave rectifier circuit generally designated by the numeral 104 and including four uni-directional elements 106, 108, 110 and 112 arranged in the conventional manner to convert alternating current to direct current. Shunted across the rectifier is a filtering capacitor 114.

Connected in series to the output terminals 116 and 118 of the power supply package 100 are a Zener diode 120 and a resistor 122 as by terminal 123. Connected in series to the output terminal 116 and terminal 123 is the lamp 70 through resistor 124. Similarly, the photocell circuit generally designated by the numeral 126 is connected across to the output terminal 116 and terminal 123 through resistor 124. The photoelectric cell circuit includes the solar cell 88 (illustrated as annular), a sensitivity control 128, a transistor amplifier 130, and a D.C. ammeter 132 all in conventional arrangement. The electrical circuit and components thereof above described are deemed conventional and well within the skill of one skilled in the art familiar with photoelectric cells and circuitry. It is not considered that the details of the circuit comprise any part of the invention herein disclosed but only a conventional manner for accomplishing the result intended. As such, it is contemplated that numerous electrical circuits and alternative components can be used without detracting from the invention.

Another embodiment of the present invention (not illustrated in the drawings) relates to the use of the invention for the measurement of radioactive contamination in a fluidized material. The fluidized material such as a gas stream is introduced into an inflow head and passes into an outflow head through the succeeding portions of the filter tape such as are illustrated in the drawings by the numerals 12, 14 and 54, respectively, in a manner identical to that described above with respect to the preferred embodiment. The radioactive contamination is deposited on the filter tape also in a similar manner. However, instead of the light source and light sensitive cells comprising the instantaneous reading apparatus generally designated in the drawings by the numeral 60, the principal component of the instantaneous reading apparatus aligned with the inflow head is a device capable of measuring levels of radioactivity and of converting the measurements into transmittable signals, such as a geiger counter or the like. Such a reading apparatus also includes an apertured wall within the housing whose aperture is aligned between the radioactive reader and the portion of filter tape being instantaneously examined to shutter the emission from the tape portion to the reader.

Radioactive contamination could also be measured in accordance with the illustrated embodiment of the invention by utilizing a pre-treated tape sensitive to radioactive material which records the quantum of radioactive material by light reflecting levels. The tape must of course permit the fluidized material containing the radioactive contamination under test to pass therethrough.

A further embodiment of the present invention (also not illustrated in the drawings) relates to a combination of (1) the instantaneous reading of contamination as deposited on sequential portions of recording tape which is illustrated in the drawings as the preferred embodiment and (2) a second reading of sequential portions of the tape 48 after contaminant deposit is complete, such as placing a second reading device similar to the reading apparatus generally designated by the numeral 60 behind the instantaneous reading device in terms to tape movement whereby the light rays reflected from the tape portions are after such portions are no longer between apertures 36 and 38. One example would be to place the second reading device so as to examine succeeding portions of the tape as they pass from between the inflow head 12 and the outflow, head 14.

In another example, the inflow head 12 and reading apparatus could be modified. The inflow head, in addition to the inflow chamber 16, as illustrated in the drawings, would include a vertical passage through its entire height substantially parallel to but spaced behind the chamber 16 with respect to the longitudinal movement of the tape 48. The lower portion of the passage could be equipped with an apertured insert similar to insert 24 such that succeeding portions of the tape would appear in the aperture after contaminant had been fully deposited. This vertical passage would also be equipped at its upper end with a window in a manner like chamber 16. The reading apparatus mounted above the inflow head 12 would be vertically partitioned to include two chambers, the first being identical to the instantaneous reading apparatus generally designated by the numeral 60 and the second also being substantially identical but positioned above the described vertical passage in the inflow head 12. The light sensitive device of the second chamber could read the quantum of contaminant previously deposited on the tape 48 by means of the flow of fluidized material under test passing through apertures 36 and 38 in inserts 24 and 30.

As such, it is possible to obtain an instantaneous reading for the contaminant as it is being deposited on the tape 48 and also a reading of the contaminant quantum after the record is complete on the tape, and such readings could be conveniently reported through electrical signals or the like to a two track chart recorder or similar device.

All of the foregoing elements, including the storage and collection reels, the motor for driving the draw off rollers, the vacuum pump, can be suitably mounted on a common base and the entire assembly may be provided with a top (not shown in the drawings) for rendering the equipment easily portable.

The apparatus and method of this invention are readily adaptable for regulation of equipment to its optimum operation in view of the produced instantaneous signal predicated on the quantity of contaminant deposited on that portion of the filter tape within the gas stream at any point of time. Further, the record having once been made on the filter tape can be retained and referred to at some subsequent time for reference purposes.

While the device of this invention has preferably been described as applicable to gas, and more narrowly, to smoke study, it is suitable for use in examining various fluid contaminants or fluent material contaminants requiring quantitative analysis. As such, it is contemplated that the invention may be used where the contaminant under consideration need be chemically treated to effect a color change either by treating the filter tape or mixing the chemical with the fluid prior to its introduction into the inflow chamber 16. Similarly, colloidal solutions and highly fluidized materials can be studied by proper filter tape selection to insure against breakage, tearing or chemical destruction.

The foregoing is considered illustrative only of the principles of the invention. Since numerous modifications to the apparatus and method described herein may be made without departing from the spirit of the invention, it should be specifically understood that the invention is in no way intended to be limited to the exact construction and operation shown and described but is to be interpreted only with respect to the appended claims.

What is claimed is:

1. A device for instantaneously reading a quantum of contaminant in a fluent material comprising, in combination, a wall having an aperture, filter means continuously moving on one side of said wall and over said aperture, means continuously passing the fluent material to be tested through said aperture and succeeding portions of said filter means for continuously recording the quantum of said contaminant on said filter means, and reading means instantaneously and continuously reading the quantum of contaminant recorded on said filter means at said aperture.

2. The combination of claim 1 wherein the fluent material is a gas and the contaminant is in a solid state.

3. The combination defined in claim 2 wherein said reading means comprises a light source positioned on the other side of said wall and longitudinally spaced from said aperture, light rays from said source passing through said aperture onto the succeeding portions of said filter means and a means for converting light energy into electrical energy positioned relative to said succeeding portions and said aperture so as to receive light rays reflected from said succeeding portions.

4. The device as defined in claim 3 wherein said filter means comprises a filter tape of sufficient width to fully cover said aperture and sufficiently close to said aperture whereby substantially all the gas passes through said succeeding portions.

5. The device defined in accordance with claim 4 wherein means for recording the contaminant on the filter means includes means for depositing a quantum of the solid contaminant on the filter tape so that the quantum of deposit determines the percentages of light rays reflected toward the means for converting light energy into electrical energy.

6. The method of continuously reporting the quantum of contaminant in a fluent material comprising moving at a constant rate succeeding portions of a recording filter tape means over an aperture fully covered by said tape means, passing the fluent material at a constant rate through said aperture and said succeeding portions whereby a quantum of contaminant is recorded on said tape, and instantaneously and continuously reading light energy directed from said succeeding portion and reporting the quantum of contaminant recorded on said succeeding portions at the time each succeeding portion is over the aperture.

7. The method in accordance with claim 6 wherein said instantaneously and continuously reading and reporting step comprises directing light rays through said aperture and onto said succeeding portions, receiving the rays reflected from said succeeding portions back through the aperture on a means capable of converting light energy into electrical energy, and transmitting the electrical energy to a reporting means.

8. A device for instantaneously reading the quantum of solids suspended in a gas comprising an inflow chamber and an outflow chamber longitudinally aligned, each chamber having an aperture in registry one with the other, said apertures arranged face to face to define a passageway therebetween for a filter tape, means to move succeeding portions of a filter tape through said passageway, means to deliver a gas to be tested to said inflow chamber, means to create a lower pressure in said outflow chamber than in said inflow chamber, a light source longitudinally spaced from said aperture in the inflow chamber for directing light rays toward said succeeding portions, and photosensitive reporting means positioned to receive light rays reflected from said succeeding portions.

9. The combination of claim 8 in which a lens and shutter means are positioned longitudinally between said light source and said inflow chamber aperture for concentrating said light rays from said source through said inflow chamber aperture onto said succeeding portions of the filter tape.

10. The combination of claim 9 wherein said photosensitive reporting means includes a photoelectric cell and an electrical circuit means to amplify and report a signal from said photoelectric cell.

References Cited

UNITED STATES PATENTS

| 2,667,779 | 2/1954 | von Brand | 73—28 |
| 2,721,495 | 10/1955 | Schaefer | 73—28 |
| 3,138,015 | 6/1964 | Avery | 73—28 |

FOREIGN PATENTS

| 665,953 | 10/1965 | Belgium. |
| 1,405,386 | 5/1965 | France. |

CHARLES A. RUEHL, Primary Examiner

J. K. LUNSFORD, Assistant Examiner